United States Patent
Lloyd et al.

(10) Patent No.: US 6,884,172 B1
(45) Date of Patent: Apr. 26, 2005

(54) ELECTRONIC GAME SYSTEM

(75) Inventors: David B. Lloyd, Cambridge (GB); Mark Tillotson, Cambridge (GB)

(73) Assignee: nGame Limited, Cambridge (GB)

( * ) Notice: Subject to any disclaimer, the term of this patent is extended or adjusted under 35 U.S.C. 154(b) by 13 days.

(21) Appl. No.: 10/004,534

(22) Filed: Oct. 25, 2001

Related U.S. Application Data

(60) Provisional application No. 60/243,191, filed on Oct. 25, 2000, and provisional application No. 60/243,209, filed on Oct. 25, 2000.

(51) Int. Cl.[7] .................................................. A63F 9/24
(52) U.S. Cl. .......................................... 463/42; 463/40
(58) Field of Search ................................ 463/40–42, 1, 463/29; 700/91–93

(56) References Cited

U.S. PATENT DOCUMENTS

| | | | | |
|---|---|---|---|---|
| 4,858,930 A | * | 8/1989 | Sato ............................ | 463/23 |
| 5,890,963 A | * | 4/1999 | Yen ............................. | 463/42 |
| 6,470,180 B1 | * | 10/2002 | Kotzin et al. ................ | 455/412 |
| 6,524,189 B1 | * | 2/2003 | Rautila ........................ | 463/40 |
| 6,527,641 B1 | * | 3/2003 | Sinclair et al. .............. | 463/39 |
| 6,745,236 B1 | * | 6/2004 | Hawkins et al. ............ | 709/218 |

* cited by examiner

*Primary Examiner*—Kim Nguyen
(74) *Attorney, Agent, or Firm*—Perkins Coie LLP

(57) ABSTRACT

A computer-based electronic gaming system is provided that maintains a persistent game world for one or more users or game players. The game system may provide a game world for a plurality of simultaneous users. Each user may be on a client device, and the gaming system may support a wide variety of simultaneous users and client devices. In one embodiment, the gaming system maintains a persistent game world for at least one user, wherein the game state for a user reconnecting with the gaming system is based on the game state for the user when they disconnected from the gaming system. In another embodiment, the user may reconnect with the gaming system with the exact same game state as when they disconnected previously.

19 Claims, 12 Drawing Sheets

This sequence shows the user logging in to the games server and selecting the game "Alien Fish Exchange"

This sequence shows "Alien Fish Exchange" in action and the user playing it. Obviously starting at "Day 1"

At this point we will assume that the game was terminated, i.e., through loss of connection or because the user chose to.

Now we come to a point where the user wishes to continue the game of "Alien Fish Exchange" they were playing before, so the user repeats the login process as before.

But this time when they come to select the game they want (in this case "Alien Fish Exchange"), the user is given the opportunity to continue their current game.

As the game loads it will allow the user to play from the point at which they left, as the following sequence shows.

ELECTRONIC GAME SYSTEM

CROSS-REFERENCE TO RELATED APPLICATIONS

This application claims the benefit of U.S. Provisional Patent Application No. 60/243,191, filed Oct. 25, 2000, and U.S. Provisional Patent Application No. 60/243,209, filed Oct. 25, 2000, which are herein incorporated by reference.

BACKGROUND

The disclosed embodiments relate to electronic games, such as electronic games played over wired or wireless connections.

With the proliferation of new technologies such as wireless phones or other devices, as well as increasing numbers of homes and workplaces that have Internet or other network connections, the demand for content to take advantage of these technologies has increased. There are many possible types of content, ranging from educational content, entertainment content, advertising content, informational content, etc. The educational content may include a plethora of options, such as multi-media entertainment, games, jokes, etc.

Gaming content has enormous potential to provide entertainment content that will improve the user's experience and provide a great deal of entertainment on connected devices, whether the connections are wired or wireless. By improving the user's experience, the desirability of the devices is also increased, which may result in increased sales or sale prices. In addition, by providing an entertaining reason for users to use devices, the possibilities for collecting data, providing advertising, etc. are also improved.

However, current games for connected devices are plagued with problems that make it impossible for these games to reach their potential. First, connected devices, particularly wireless devices, often have limited hardware and software capability. Accordingly, games on these devices are limited by this capacity and do not have the graphics, sounds, depth, or complexity that would otherwise be possible. Moreover, current games for connected devices do not have sophisticated multi-user or multi-session capability. For example, a multi-user game requires all users in the game to be connected simultaneously. If a user drops his or her connection, that user loses his or her place in the game. This problem makes multi-user games less engrossing and less appealing. In addition, current games do not allow for users on different platforms (e.g., mobile phone, palmtop computer, etc.) to play in the same game or against each other because of differences in the platforms.

Wired or wireless devices may be connected via a network, such as the Internet or an intranet. The Internet comprises a vast number of computers and computer networks interconnected through communication channels. The Internet is used for a variety of reasons, including electronic commerce, exchanging information such as electronic mail, retrieving information and doing research, and the like. Many standards have been established for exchanging information over the Internet, such as electronic mail, Gopher, and the World Wide Web ("WWW"). The WWW service allows a server computer system (i.e., web server or web site) to send graphical web pages of information to a remote client computer system. The remote client computer system can then display the web pages. Each resource (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends the requested web page to the client computer system. When the client computer system receives that web page, it typically displays the web page using a browser. A browser is typically a special-purpose application program for requesting and displaying web pages.

Currently, web pages are often defined using HyperText Markup Language ("HTML"). HTML provides a standard set of tags that define how a web page is to be displayed. When a user makes a request to the browser to display a web page, the browser sends the request to the server computer system to transfer to the client computer system an HTML document that defines the web page. When the requested HTML document is received by the client computer system, the browser displays the web page as defined by the HTML document. The HTML document contains various tags that control the display of text, graphics, controls, and other features. The HTML document may contain URLs of other web pages available on that server computer system or on other server computer systems.

New protocols exist, such as Extensible Mark-up Language ("XML") and Wireless Access Protocol ("WAP"). XML provides greater flexibility over HTML. WAP provides, among other things, the ability to view web pages over hand-held, wireless devices, such as cell phones and portable computers (e.g. PDA's).

Note: the headings provided herein are for convenience and do not affect the scope or interpretation of the invention.

DETAILED DESCRIPTION

Embodiment of the invention, described below, permit a user on a connected device to interact with a persistent game world. The user may be playing a game any type of connected device, either wired or wireless, such as wireless phones, personal digital assistants (PDAs), personal computers, etc. The game world allows for multi-user capability, including users on a wide variety of platforms, so that users can play each other, even if they are on different types of devices. The user also experiences a persistent game world, so that if the user is disconnected, either voluntarily or involuntarily, the user can return to a game world that is consistent with what they would expect, such as the exact same game world or a game world that has advanced in a reasonable fashion.

The following description provides specific details for a thorough understanding of, and enabling description for, embodiments of the invention. However, one skilled in the art will understand that the invention may be practiced without these details. In other instances, well known structures and functions have not been shown or described in detail to avoid unnecessarily obscuring the description of the embodiments of the invention.

Figure 1:
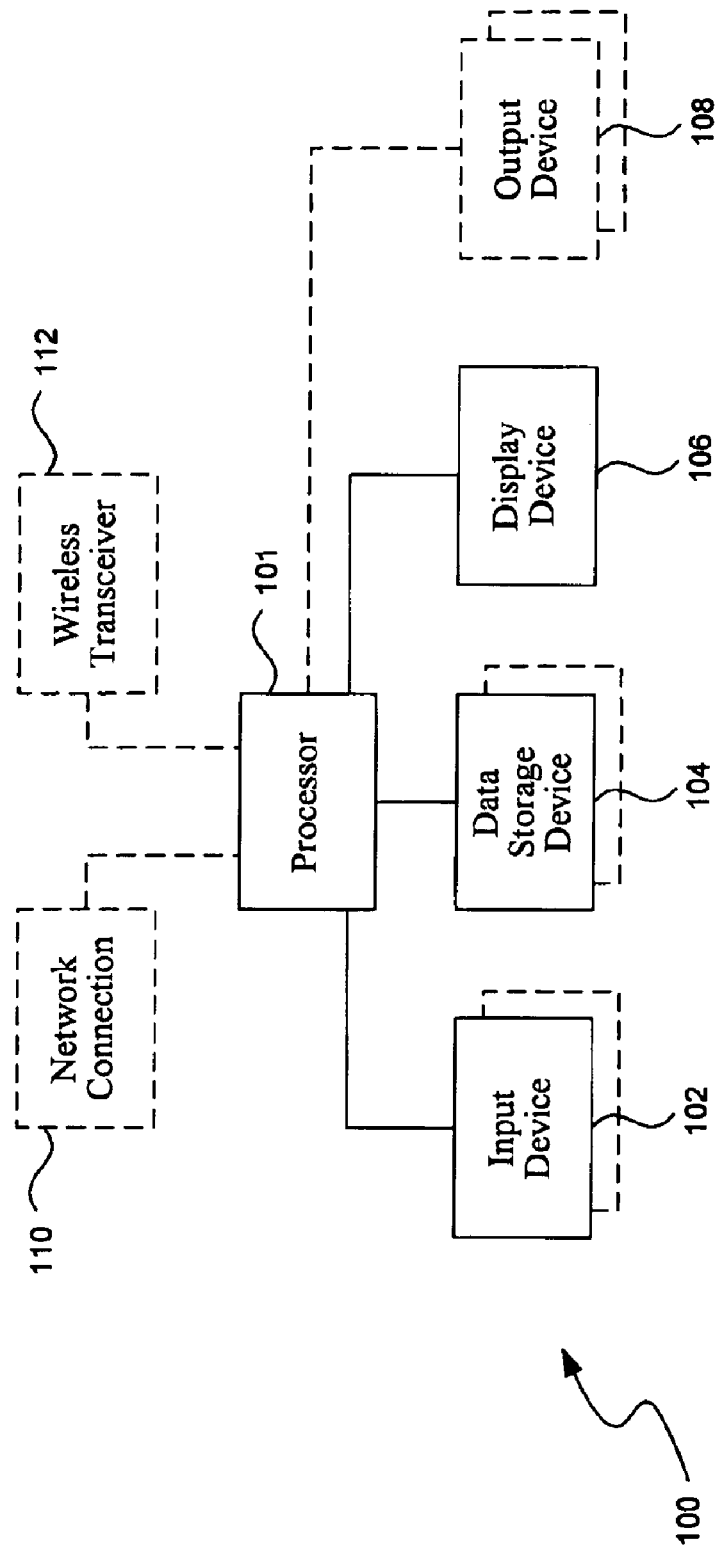
FIG. 1 is a block diagram of a suitable computer for employing aspects of the invention.

FIG. 1 and the following discussion provide a brief, general description of a suitable computing environment in which aspects of the invention can be implemented. Although not required, aspects and embodiments of the invention will be described in the general context of computer-executable instructions, such as routines executed by a general purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or the Internet. In a distributed computing environment, program modules or sub-routines may be located in both local and remote memory storage devices. Aspects of the invention described below may be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the invention reside on a server computer, while corresponding portions reside on a client computer. Data structures and transmission of data particular to aspects of the invention are also encompassed within the scope of the invention.

Referring to FIG. 1, one embodiment of the invention employs a computer 100, such as a personal or portable computer, having one or more processors 101 coupled to one or more user input devices 102 and data storage devices 104. The computer is also coupled to at least one output device such as a display device 106 and one or more optional additional output devices 108. The computer may be coupled to external computers, such as via an optional network connection 110, a wireless transceiver 112, or both.

The input devices 102 may include a keyboard and/or a pointing device such as a mouse. Other input devices are possible such as a microphone, joystick, pen, game pad, scanner, and the like. The data storage devices 104 may include any type of computer-readable media that can store data accessible by the computer 100, such as magnetic hard and floppy disk drives, optical disk drives, magnetic cassettes, flash memory cards, digital video disks (DVDs), Bernoulli cartridges, RAMs, ROMs, smart cards, etc. Indeed, any medium for storing or transmitting computer-readable instructions and data may be employed, including a connection port to a network such as a local area network (LAN), wide area network (WAN) or the Internet (not shown in FIG. 1).

Figure 2A:
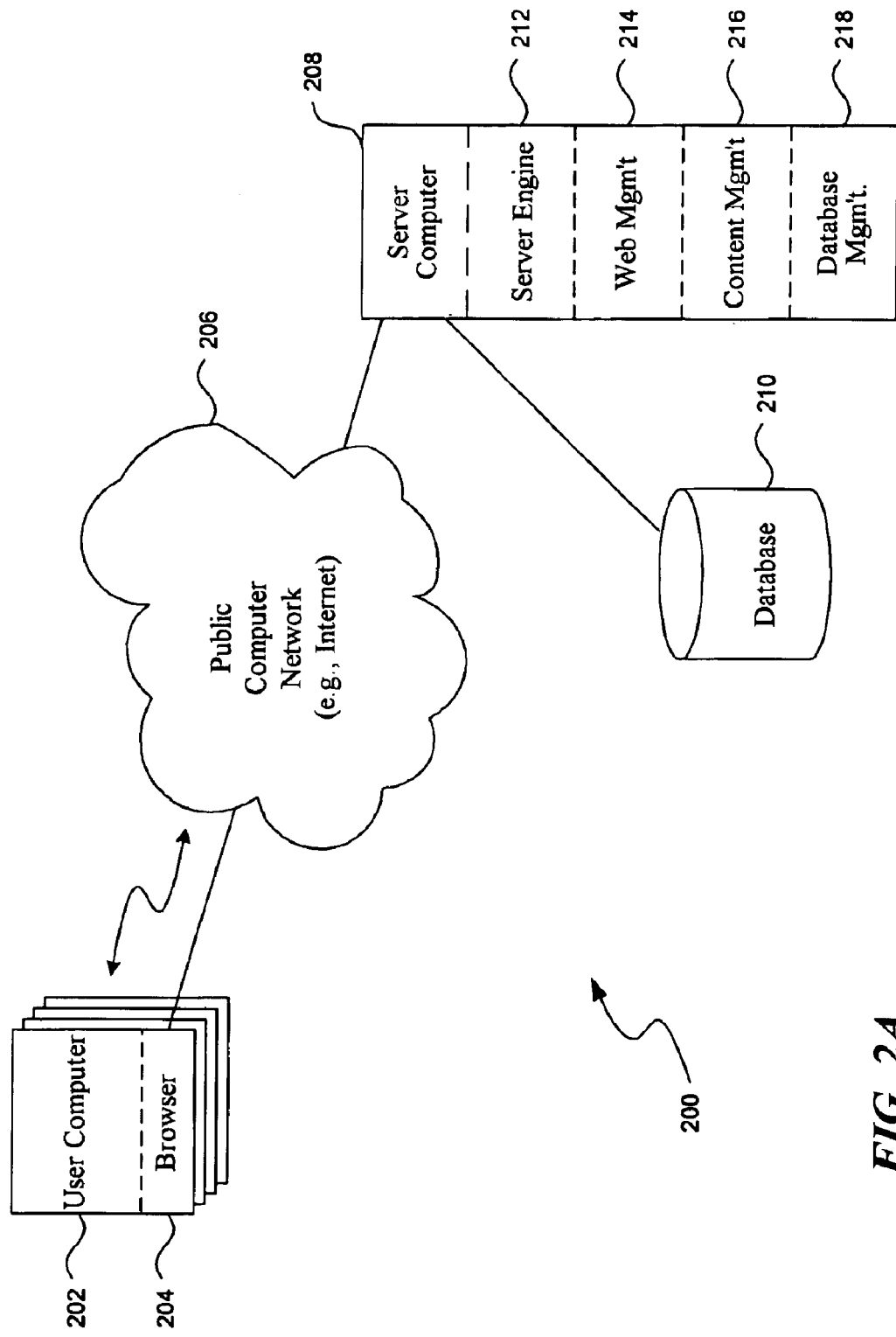
FIG. 2A is a block diagram illustrating a suitable system in which aspects of the invention may operate in a networked computer environment.

Aspects of the invention may be practiced in a variety of computing environments. For example, referring to FIG. 2A, one or more user computers 202 in a system 200 are shown, each of which includes a browser program module 204 that permits the computer to access and exchange data with the Internet 206, including web sites within the World Wide Web portion of the Internet. The user computers may include one or more central processing units or other logic-processing circuitry, memory, input devices (e.g., keyboards and pointing devices), output devices (e.g., display devices and printers), and storage devices (e.g., magnetic, fixed and floppy disk drives, and optical disk drives), all well known but not shown in FIG. 2A. User computers may include other program modules such as an operating system, one or more application programs (e.g., word processing or spread sheet applications), and the like. The user computers 102 include wireless computers, such as mobile phones, personal digital assistants (PDA's), palm-top computers, etc., which communicate with the Internet via a wireless link.

A server computer 208, coupled to the Internet or World Wide Web ("Web") 206, performs much or all of the functions for receiving, routing and storing of electronic messages, such as web pages and electronic trades or postings. While the Internet is shown, a private network, such as an intranet, may likewise be used herein. A database 210, coupled to the server computer, stores much of the web pages and content exchanged between the user computers. The server computer, including the database, may employ security measures to inhibit malicious attacks on the system, and to preserve integrity of the messages and data stored therein (e.g., firewall systems, secure socket layers (SSL) password protection schemes, encryption, and the like).

The server computer 208 includes a server engine 212, a web page management component 214, a content management component 216 and a database management component 218. The server engine performs basic processing and operating system level tasks. The web page management component handles creation and display or routing of web pages, as described below. Users may access the server computer by means of a URL associated therewith. The content management component handles most of the functions in the embodiments described herein. The database management component includes storage and retrieval tasks with respect to the database, queries to the database, and storage of data such as status of offers and market conditions.

Figure 2B:
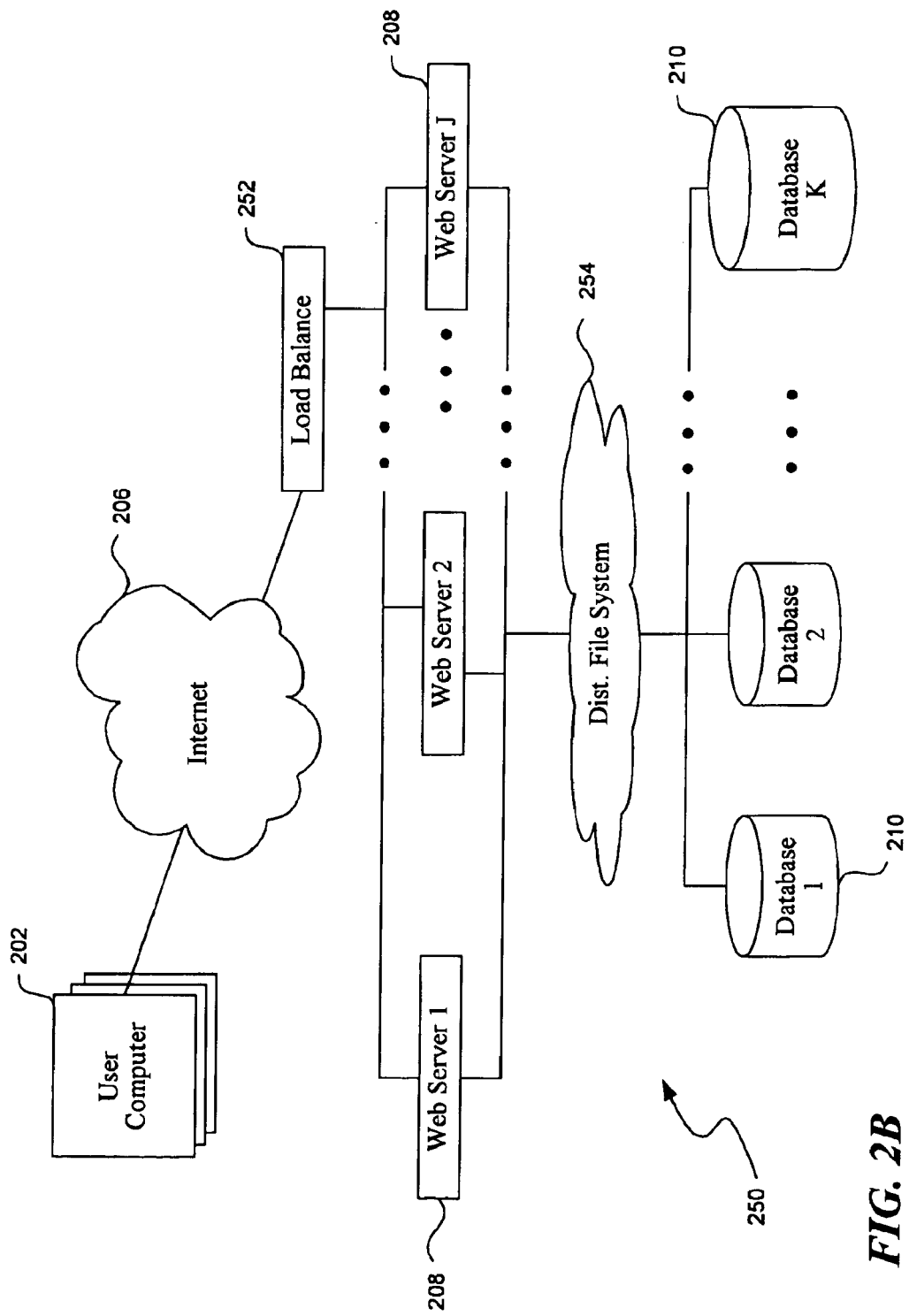
FIG. 2B is a block diagram illustrating an alternative system to that of FIG. 2A.

Referring to FIG. 2B, an alternative embodiment to the system 200 is shown as a system 250. The system 250 is substantially similar to the system 200, but includes more than one web server computer (shown as server computers 1, 2, . . . J). A web load balancing system 252 balances load on the several web server computers. Load balancing is a technique well-known in the art for distributing the processing load between two or more computers, to thereby more efficiently process instructions and route data. Such a load balancer can distribute message traffic, particularly during peak traffic times.

A distributed file system 254 couples the web servers to several databases (shown as databases 1, 2 . . . K). A distributed file system is a type of file system in which the file system itself manages and transparently locates pieces of information (e.g., content pages) from remote files or databases and distributed files across the network, such as a LAN. The distributed file system also manages read and write functions to the databases.

The discussion herein provides a brief, general description of a suitable computing environment in which aspects of the invention can be implemented. Although not required, embodiments of the invention will be described in the general context of computer-executable instructions, such as routines executed by a general purpose computer, e.g., a server or personal computer. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like. The invention can be embodied in a special purpose computer or data processor specifically programmed, configured or constructed to perform one or more of the computer-executable instructions explained in detail below. Indeed, the term "computer", as used generally herein, refers to any of the above devices, as well as any data processor.

The invention can also be practiced in distributed computing environments, where tasks or modules are performed by remote processing devices, which are linked through a communications network, such as a Local Area Network ("LAN"), Wide Area Network ("WAN") or public network such as the Internet. In a distributed computing environment, program modules or sub-routines may be located in both local and remote memory storage devices. Aspects of the invention described herein may be stored or distributed on computer-readable media, including magnetic and optically readable and removable computer disks, as well as distributed electronically over the Internet or over other networks (including wireless networks). Those skilled in the relevant art will recognize that portions of the invention may reside on a server computer, while corresponding portions reside on a user computer (and possibly computers of other third parties). Data structures and transmission of data particular to aspects of the invention are also encompassed within the scope of the invention. In general, while hardware platforms, such as clients and servers, are described herein, aspects of the invention are equally applicable to nodes on the network having corresponding resource locators to identify such nodes.

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

Figure 3:
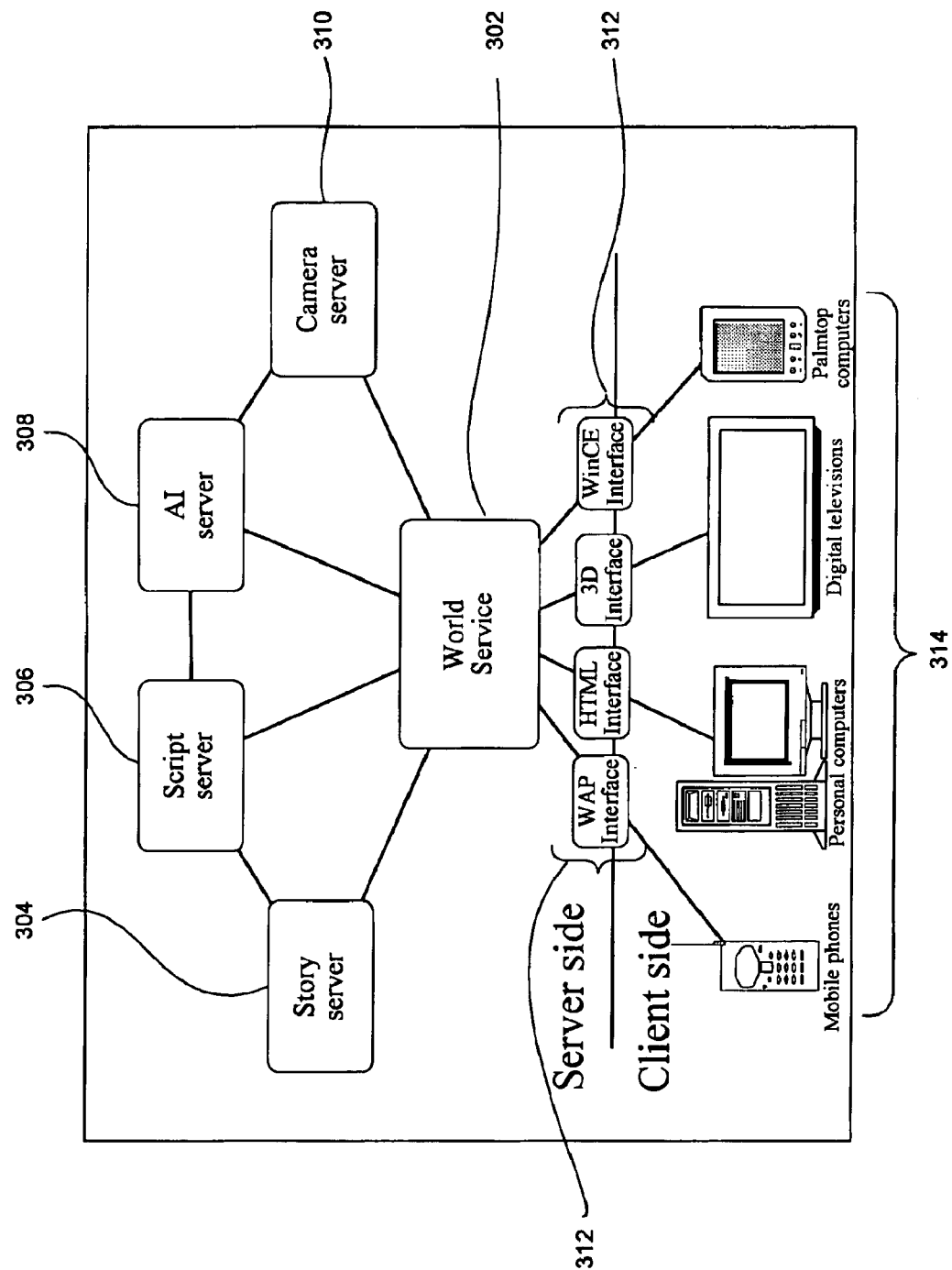
FIG. 3 is a block diagram illustrating a suitable system in which aspects of the invention may operate in a networked computer environment connected with client devices in one embodiment.
Figure 4:
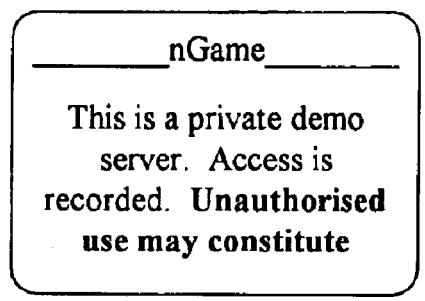
FIGS. 4–34 illustrate a user interface for a persistent game world in one embodiment.
Figure 5:
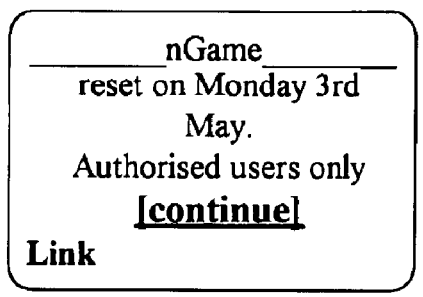
Figure 6:
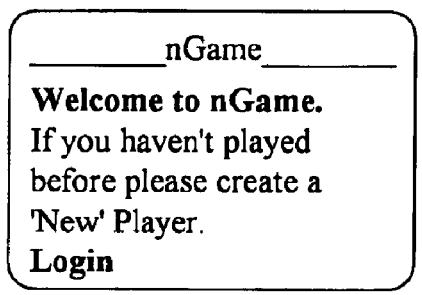
Figure 7:
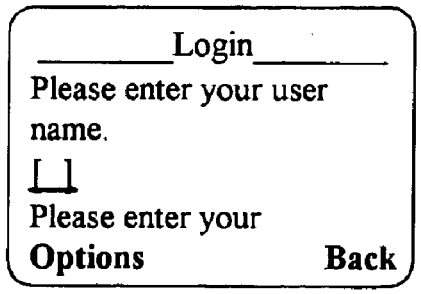
Figure 8:
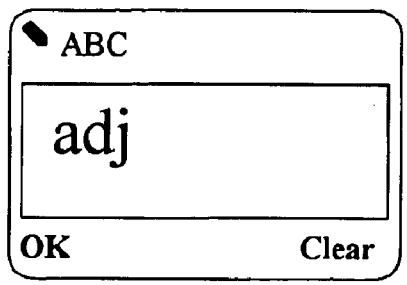
Figure 9:
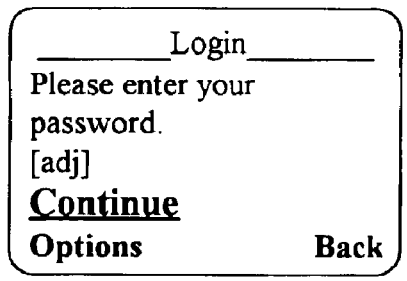
Figure 10:
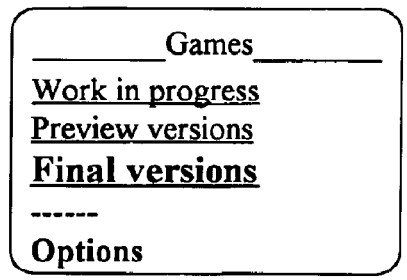
Figure 11:
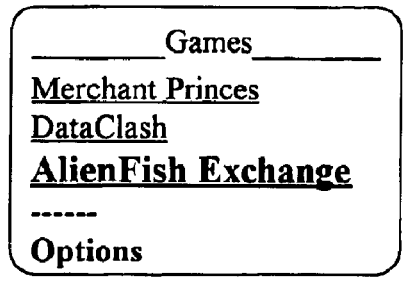
Figure 12:
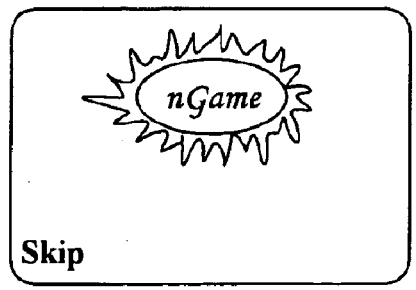
Figure 13:
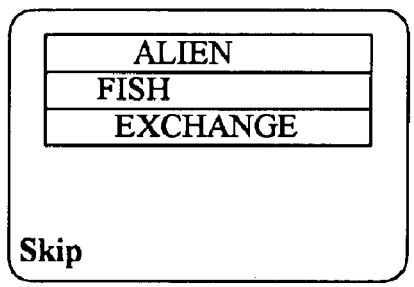
Figure 14:
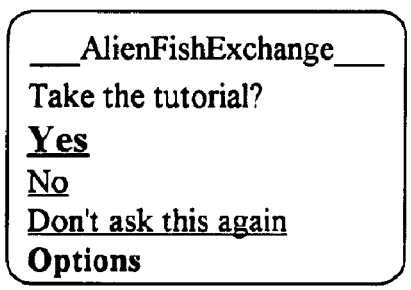
Figure 15:
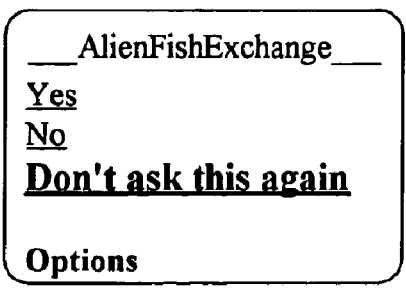
Figure 16:
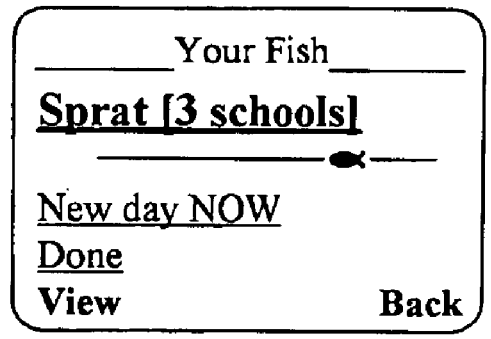
Figure 17:
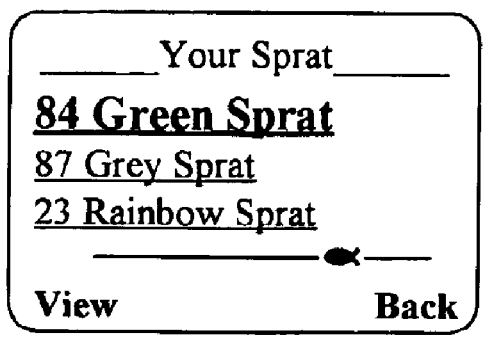
Figure 18:
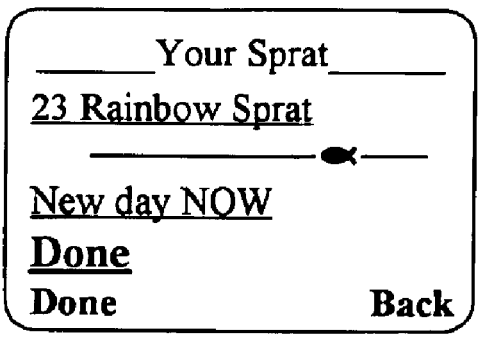
Figure 19:
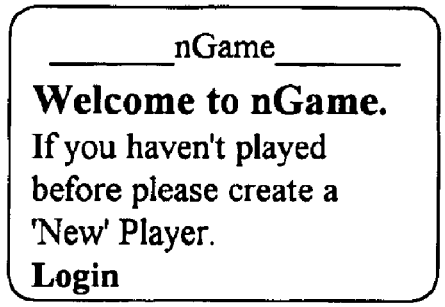
Figure 20:
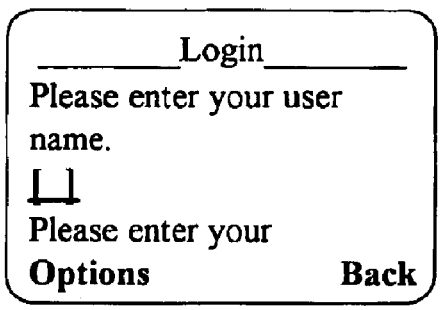
Figure 21:
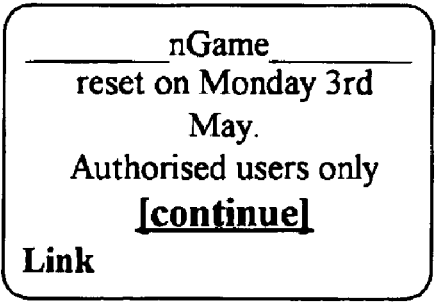
Figure 22:
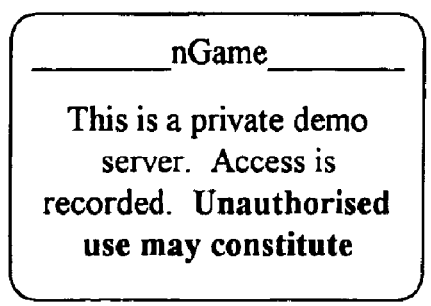
Figure 23:
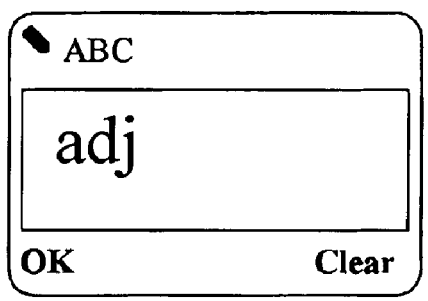
Figure 24:
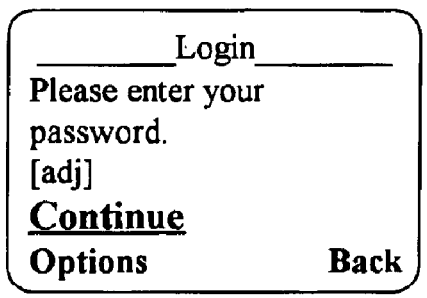
Figure 25:
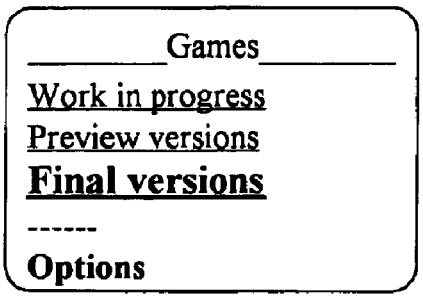
Figure 26:
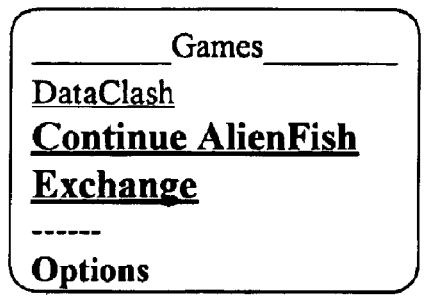
Figure 27:
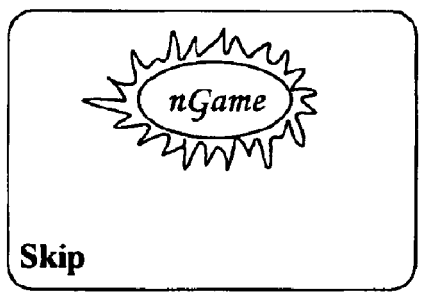
Figure 28:
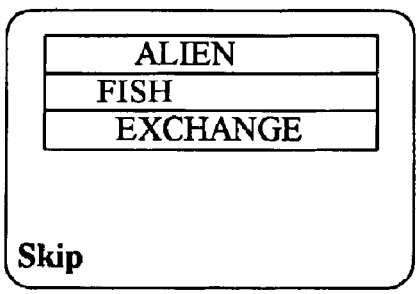
Figure 29:
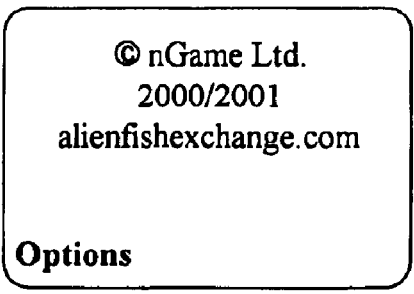
Figure 30:
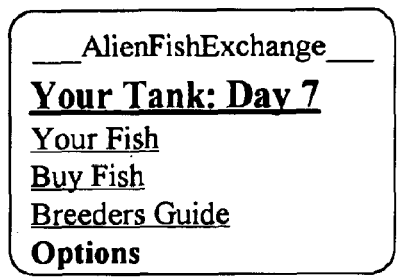
Figure 31:
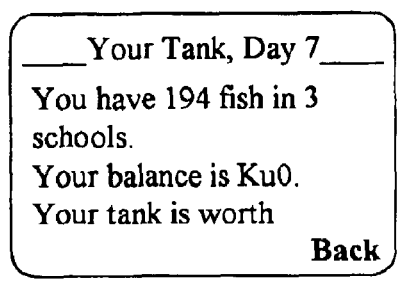
Figure 32:
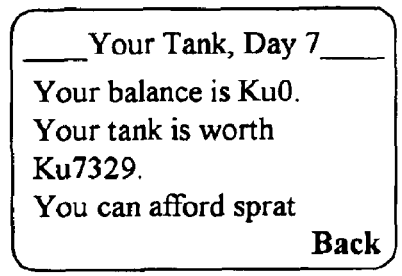
Figure 33:
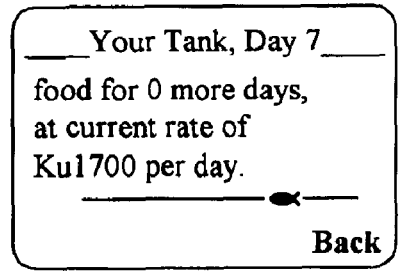
Figure 34:
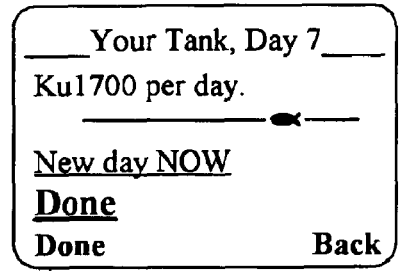

FIG. 3 is a block diagram illustrating a suitable system in which aspects of the invention may operate in a networked computer environment connected with client devices in one embodiment. FIG. 3 shows a system 300 that is an alternative embodiment to the system 200 and system 250. The server side of the connected gaming system includes a world service server 302, a story server 304, a script server 306, an artificial intelligence (AI) server 308, and a camera server 310. Each of the servers may provide content, processing power, connection ability, or other capabilities. The world service server 302 acts as a central server to perform general communications, administrative, data storage, game processing, or any type of task, as well as to coordinate activities between the other servers. The story server 304 may be used to store and process "stories" for games, such as plots, events, actions, etc. The script server 306 may be used to store and process scripts. The AI server 308 may be used to store and process AI routines, such as logic necessary to host games. The camera server 310 may be used to store digital photographs, provide real-time camera views, store digital video, etc. The server side also includes one or more interfaces 312 that provide a connection between the world service server 302 and client devices 314. The interfaces 312 may include a WAP interface, a HTML interface, a 3D interface, a WinCE interface, a Palm OS interface, etc. In one alternative embodiment, the functions of two or more of these servers may be combined in a single server.

The use of a client/server solution for delivering content provides many benefits in the world of the Internet and by implication, the mobile Internet as well. It is also of value in the emerging new world of digital cable and satellite TV networks. Indeed, it is useful wherever content is to be delivered to a client platform that is too limited to hold the entire body of the content, but has a connection to the server that allows the client to request the next chunk of content to be requested and viewed. The bulk of the gaming application may therefore be stored and run on a server, while information can be transmitted to the client computers only as needed. From the developer's perspective, there is further advantage as a client/server solution allows the content programming to be divorced from both presentation logic and graphical assets.

Servers

The servers described in FIG. 3 may use any type of suitable software. In one embodiment, Java is used. Java provides for robust and reliable performance and cross-platform portability. Java is robust because memory management is handled by a garbage collector eliminating many classes of programmer error, and because run-time errors are trapped allowing for the implementation of failure strategies, which reduces their impact on a running service. Cross-platform portability allows the servers to run transparently on Windows NT, Solaris, Linux and so on. Java also provides integration with a wide variety of other technologies, including database access, remote method invocation for distributed systems, speech, 2D and 3D graphics and so forth.

The server software may service many users simultaneously. A pool of threads may be maintained to avoid time overhead in creating a new thread for each access request. The server may be used as a glorified web server and can deliver both static and dynamic content. The server software may also, unlike a conventional web server, allow users to interact with each other in a variety of ways, ranging from simple chat and shared high scores to highly complex virtual worlds. The server provides a variety of means of user access including secure encrypted client login and session management.

The server software may also support many different content protocols simultaneously. These content protocols may be open standards such as HTML, WML, etc., or they may be proprietary—often designed for a specific piece of content or class thereof. For example, in one embodiment a simple 3D client may be based on id Software's Doom, which communicates with the server via simple text messages. Content delivery protocols may be connected (such as telnet) or connectionless (such as HTTP).

Content may be written for a specific protocol or it may take advantage of the abstraction layers provided by the server to format content specifically for whichever client platform is required.

For example, the same player may access a particular program via his/her mobile phone during the day, and play via his/her TV in the evening. The experience of the content may be radically different between the platforms, but it is still the same game. At the same time, a game administrator may monitor and maintain the content via a secure telnet login.

The servers may provide both static and dynamic content. Static content, such as prepared images, movie sequences, sound clips and so on, can be served directly from the filestore or other database, but for dynamic content the server provides an object relational database resident in memory but saved to the filestore or other database on a frequent basis. This allows the database to be persistent across server downtime or content upgrades. When content is updated, the state of the existing database would not be lost. Instead, the server may provide schema evolution, allowing the server to be taken down and restarted with new logic transparently to the users. The database and its associated management system may also be based on software from Oracle, Microsoft, etc.

The server may also provide administrative services, such as providing full logging of sessions and allowing remote status monitoring by the system administrators. In addition to the usual server-side administration, the server may provide standard means to allow administration within the content world—for example, it may be necessary to discipline antisocial players 'in-game' without resorting to barring them from the service.

Client Platforms

There are a wide variety of client devices or platforms 314 available. The server is client-agnostic and it is a simple matter to add support for a new type of client, so the system should be functional with virtually any type of client device 314. For example, the client devices 314 may include mobile phones (e.g., WAP-enabled mobile phones), personal computers, digital televisions, set top boxes, palmtop computers, personal digital assistants, etc.

In one embodiment, a telnet client is used with the client device 314. Telnet terminals are simple mono-spaced fixed page size terminals dating back to the beginning of the Internet. Although they are no longer used by the general public, they still have virtues for system administrators. Telnet is a connected protocol requiring a single login that lasts for the entire session. In one embodiment, the server may provide support for telnet by removing any XML-style formatting tags and formatting the resulting plain text to the desired page size.

In a second alternative embodiment, a web/HTML client may be used with the client device 314. The modern front end to the internet is the Web, using HTML as the base content format, and blending text, images and other media types into a single presentation. It may be delivered via HTTP, a connectionless protocol, which necessitates session management so that one login leads to a coherent dialog between browser and server. HTML also appears as a content format on many digital television set-top boxes, PDAs and some mobile phones. However it must be noted that while digital television uses HTML, it is usually an older and more restrictive form than the version currently available on the Internet. This requires support from the server to repurpose general content for the limitations of a specific HTML client.

In a third alternative embodiment, the client device 314 may be a WAP-enabled mobile phone. Recently mobile phones have begun to support a limited version of the Web—the 'mobile internet'—which uses WML, an HTML-like format designed with the limitations of a small screen, numeric keypad and limited memory in mind. The server also may acts as a WAP server and include support for delivering compiled WML (WMLC) direct to the mobile phone, thus eliminating the latencies introduced by many phone operators' gateways in compiling the WML en-route.

In a fourth alternative embodiment, the client device 314 may be a digital television or set top box. While some channel operators provide Web-based set-top boxes there are other content delivery protocols used on set-top boxes that include MHEG, OpenTV's proprietary resource format. Digital television has further potential, however, in allowing interactive content to be blended with streaming MPEG video. Many set-top boxes allow downloadable applications (or browser plug-ins) and a lightweight 3D client application, such as one based on iD Software's Doom engine (now available under GPL), may be used. The 3D client application may include supporting tools such as a map editor and asset manager. The 3D client application allows multiplayer content communicating over the network and administered from the channel operator's head-end. One skilled in the art will recognize that other custom client applications are possible for digital television, such as a 2D animation client (akin to ShockWave or QuickTime VR), allowing for a great variety of content to be delivered to a digital television platform.

Game Programming Language Features

Traditional programming languages have fallen short when applied to developing games. In one embodiment, a new programming language is used that is optimized for developing games on a wide variety of platforms with a persistent universe. This may also be described as a 4GL domain-specific persistent object-relational simulation language.

This game programming language may be designed for rapid training of technically literate developers but not necessarily experienced programmers. It includes many abstractions that allow developers to express their ideas directly without being encumbered by the details of implementation. Its ease of use may be likened to the way HTML takes the design of user interface logic out of the hands of C++ programmers directly invoking the GUI and puts it into the hands of graphic artists and web designers who can concentrate on the essence of look and feel.

The game programming language may also use a simple syntax owing more to natural language grammar than mathematical algebra. The language uses layout, indentation and verb-noun phrases with the result that source text is remarkably free from brackets, braces, colons, semicolons and all the other punctuation beloved by languages such as Java and C++ that tend to obfuscate the meaning of the code.

The game programming language may also be designed for developing multi-user multi-client content and as such the language reflects this design in the facilities provided. It may differ from a 'universal' or 'general-purpose' language such as C++ in providing many facilities specific to the task at hand in a short-hand fashion. This pragmatic approach would ensure that developers do not have to repeatedly write clumsy syntax for common operations just to preserve the purity of the language.

The game programming language may also be an object-oriented language such as Java, C++, etc., so that rules of behavior are defined for classes of objects and objects inherit behavior from simpler prototypes.

The game programming language may also record data as relations between objects rather than using variables—for example the fact that a table is in a room might be recorded as "Within table room" rather than arranging that the table points to the room (or should it be vice versa? or both ways?). The language provides control structures to query the relations on objects and either way round may be queried (what is in the room? or what is the table within?). Relations in the language may be similar to tables in relational databases or functors in logic programming.

The game programming language should support a persistent game world. The state of the world running on the server can be committed to the filestore or other database on a regular basis and later restored. This provides security against the server crashing, and allows for scheduled downtime without losing players' investment in the evolution of the content. Further, should the content be updated, the programming language provides in-language mechanisms whereby the existing world state can be migrated seamlessly onto the new logic. Not only does the language make this easy, but it verifies changes to the logic as to where an update rule is mandated and will not let the developer make such mistakes.

For example, one might start with a 2D world where the position of a thing is indicated by a relation "Position thing (x y)" and later might need to support a 3D client and now need to revise the relation to be "Position thing (x y z)." It is not sufficient to set the z component to zero as this will lead to bizarre artifacts with things hanging under floors and above ceilings. But it might be sufficient to define a rule that on migration to the new schema sets the z component to that of the floor of the room that it is within. More complicated rules could be devised to suit other situations.

The game programming language may support event-driven evolution of a game world, where evolution is driven by actions changing global state. Unlike a traditional program with its notion of a linear sequence of operations to perform (C's main), it is requests from users in the outside world that ultimately trigger most of the behaviour (although there are limited scenarios where it makes sense for a game world to evolve without any user intervention). User-initiated events map directly to the invocation of an action rule. The mapping itself may also be defined, allowing developers to add new items to HTML menus or new telnet commands with ease.

The game programming language may also provide an event simulator to simulate behavior that evolves in real-time (or to provide real world events). The language may be used to initiate an event after a certain number of seconds (or minutes, hours, etc) or repeatedly every number of seconds. This allows for the simulation of a very complex evolving world for users to interact with.

The game programming language may also provide an easy client interface, since the main job of the server is to remotely control the presentation of content on the user's client platform. Each user has a mirrored presence in the server's world known as an avatar which corresponds with an object whose behavior is defined by the program. Communication with the client is via this avatar object—events from the client trigger actions in the avatar object, and content to be sent to the client is done so through the avatar object.

Further, content sent to the client is filtered through a formatting layer allowing the content to adapt to the client at hand (e.g., the Nokia 7110 omits many features of WML; the Phone.Com WAP gateway maps WML content to HDML; telnet clients have different page widths; . . .). And it is also a convenient layer to provide some post-processing on the content such as sorting out pluralization on generated text, avoiding irritations such as "You have 1 messages".

The game programming language may provide for new built-in facilities that can be added with ease by a Java programmer to support content developers encountering new needs. The language may also automatically generate cross-referenced documentation of the source code when compiling. It is presented in HTML and so is viewable in any web browser with hyperlinks to cross-reference rule definitions with applications. Comments in the language that include HTML markup are passed through allowing developers to document their code in a clean and tidy fashion (a good example might be referencing an illustrative diagram). This is a valuable tool to help developers keep track of what is going on.

In addition to the general features, the game programming language may also provide a variety of other facilities available built-in or from standard libraries. These are provided to simplify the life of a content developer and are extremely easy to extend to meet new challenges. These include database integration via JDBC, easy support for internationalization, library support for many common clients, 'God' avatars that allow remote administration of live content directly within the world, etc.

A suitable game programming language is described in International Patent Application No. PCT/US01/45554, entitled "ELECTRONIC GAME PROGRAMMING SYSTEM", filed Oct. 25, 2001, and United States Patent Application No. 10/032,711, entitled "ADAPTING A GAME STATE TO BE COMPATIBLE WITH A NEW VERSION OF A GAME", filed Oct. 25, 2001, which are hereby incorporated by reference herein.

Classes of Content

The types of games and other content that may be used are limited by only the imagination. A few examples are described below:

One type of game is the Multi-User Dungeon (MUD), which is in many respects where this type of gaming started. Although generally perceived as somewhat 'geeky' (to quote Richard Bartle, creator of the original Essex MUD back in 1979: "I am Geek, Son of Dweeb, Son of Nerd, Who dares enter my domain?"), MUDs in renewed guises are still widely popular.

Another type of content is the photo world, which may be a simple world allowing the player to wander around an area. It may use a large number of photographs (including panoramic views) as a way of navigating around with the intention of providing a historical tour of the local architecture where groups of virtual tourists could interact with each other and their AI scripted guide, providing a virtual tour of an area, etc.

More traditional games such as first-person shooters, 3D games, action games, adventure games, combat games, educational games, trading or economic simulation games, interactive thrillers, interactive stories, simulations, etc. may also be used as content. In one example, a trading game allows a player to act as a merchant moving along the trade routes between the major cities of an era buying goods low and selling high. Players would compete with each other to see how much money they can amass.

In another embodiment, the content could be training or educational matter. For example, training simulations can be used to train a workforce, or educational content could be used by high school students.

In another embodiment, a complete integrated studio suite may be used to rapidly create content from a variety of sources and deliver that content over a wide range of client platforms. The content could cover a wide range of media types including sound and music, as well as 2D & 3D animation combined with virtual sets and streaming video to achieve the 'holy grail' of interactive television.

Persistent Game State

As described above, the state of a game may be maintained for each user (or player). To accomplish this, a protocol for how a new connection is identified and handled is established to ensure that the user's experience is as seamless as possible. Ideally, a user could break off contact with the game world (e.g., turning their cell phone off, losing their connection, etc.), and when they reconnect with the game world at a later time, experience a game world that is consistent with what they would expect. For example, in many game worlds, a user would expect the game world to be exactly the same as when they left it, while in other game worlds (e.g., a MUD), the game world might have changed as "life went on" in the game world without their presence.

Within the game world, a user's state may consist of data-structures including a particular player object. The player object is special in that for each such object there is an associated "avatar" object that mediates the connection between a user's incoming requests and communications and the player object. The state includes, but is not limited to, the player object and its attributes. For instance the object can be related to (using the game's relations or particular relations of the game programming language) other objects forming part of the player's local state or global state or other player's state.

The objects and relations form a graph (or "heap") and depending on the game and its coding, a user's state can reside, in general, anywhere in this large data-structure. However the player object is the starting point and principal definer of a player's identity in the game world. Typically there is a well-defined boundary between local state and shared or global state in a game.

To connect to a game a user might initiate a message in some protocol such as HTTP, telnet, SMS, email, instant messaging. For a user that has not communicated for some while, they are required to provide identification and authentication in the form of a name and password (although for some media this might be done differently, such as a mobile-phone subscriber id field).

The name and password are used by the protocol handler in the game engine to both search for the correct avatar, and check that this is the genuine user (that the password matches). Having passed such tests, the avatar object's "player" field is extracted to yield a pointer to the player object, upon which game or programming actions can be performed. The protocol handler performs the translation between the information supplied and the call to the game programming language action. Typically the action is queued on the event handler for immediate execution by a thread asynchronous to the game engine proper. This allows incoming requests to be acknowledged rapidly but defers their full execution to the game engine proper.

The actions queued on the event queue typically contain a reference back to a stream or similar needed by the protocol handler for communicating the full results back to the user's appliance.

Such queued actions with references to protocol state may not be saved in the world-files generated by serialization, and they would therefore be deemed volatile in the event of the game service being restarted, moved, upgraded.

Certain protocols support a more secure and efficient means for identifying the user, but only in the short term—after a preset period of inactivity on the users part the full name/password authentication may be required.

In some embodiments, HTTP random session-id's are created when a user connects, and passed around encoded in the URL's to permit quick identification of the user without having the password in the clear in the message.

A strongly random value may be selected and mapped to a session object that also points to the player object—in effect a parallel mechanism to the avatar one. By making the random values long enough they are hard to guess by trial and error, and by timing them out after inactivity they become useless after a session finishes.

A session may be defined as finishing if the inactivity timeout period elapses without incoming requests, and session-id and accompanying session object are deleted. Session objects do persist in the world across saves/restores, since their timeout period of the order of minutes or hours is large compared with a typical upgrade or maintenance cycle.

In a more general sense there is no explicit end to a session to the server (although some protocols like telnet support it)—the server is always there and the player's game state is always there to be accessed as and when. It is a matter of game-specific programming when a user's game state is reset or removed—this can be never, on explicit user direction, after a timeout period, or when a multi-player game finishes.

From a user or player's perspective, the persistent game world should be accessed seamlessly. For example, a player may log out in the middle of a multi-user adventure game. When the player reenters the game from a client device 314, in many cases the player could be reinserted in the game in the state where they left it. The player's alter ego in the game could have "slept" in a hotel while the player was doing other tasks. Depending on the structure of the game, other players may have advanced their characters while the first player was inactive. In some embodiments, a password or other authorization is necessary to reenter the game.

FIGS. 4–34 illustrate a user interface for a persistent game world in one embodiment. FIGS. 4–11 illustrate the display screens that a user on a client device 314 would see when logging in to a game of "Alien Fish Exchange," a sample persistent game world. The user in this embodiment would need to enter a user name and password to access the game. FIGS. 12–18 illustrate a few sample display screens of a user playing the game. After the user loses the connection to the game, the user may reconnect and continue the game that they had left. FIGS. 19–26 illustrate a login process for a user reentering a game they had been disconnected from. This can be seen in FIG. 26, where the user is selecting the "Continue Alien Fish Exchange" option which will reaccess the persistent game. In FIGS. 27–34, the continuing game is illustrated, as the user can pick up where he or she left off in their game, so that their efforts from the previous session were not wasted.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein" and "hereunder" and words of similar import, when used in this application, shall refer to this application as a whole and not to any particular portions of this application. Use of the term "or," as used in this application with respect to a list of two or more items, shall be interpreted to cover any, all, or any combination of items in the list.

The description of embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. For example, while steps of the various routines are presented in a given order, alternative embodiments may perform routines having steps in a different order. The teachings of invention provided herein can be applied to other game systems, not necessarily the system described herein. The various embodiments described herein can be combined to provide further embodiments. These and other changes can be made to the invention in light of the detailed description.

We claim:

1. A method of playing a game on a server by a user on multiple client devices, the game containing a persistent game world, comprising:

establishing a game state on a game engine running on the server, wherein the game engine includes a protocol handler that supports multiple content protocols simultaneously and facilitates communication between the multiple client devices and the game engine;

disconnecting from the game on the server at a time when the user is at a particular state of the game, wherein the disconnection ends a first session, wherein the first session is played on a first client device having a first device type, and wherein the first client device and the game engine communicate using a first protocol;

reconnecting to the game at a later time;

transmitting identifying information to the server; and playing the game in a second session, wherein the state of the game at the beginning of the second session is based on the state of the game at the end of the first session, wherein the second session is played on a second client device having a second device type, and wherein the second client device and the server communicate using a second protocol that is distinct from the first.

2. The method of claim 1 further comprising selecting a WML link to advance the state of the game.

3. The method of claim 1 wherein at least one of the first or second client devices is a wireless phone.

4. The method of claim 1 wherein at least one of the first or second client devices is a wireless device.

5. The method of claim 1 wherein the state of the game at the end of the first session and the state of the game at the beginning of the second session are the same.

6. The method of claim 1 wherein the state of the game at the beginning of the second session constitutes a progression beyond the state of the game at the end of the first session.

7. A method for providing a gaming environment for one or more users on client devices comprising:

establishing a protocol handler at a server;

for each client device, maintaining a game state on a server, wherein the server supports multiple content protocols simultaneously via the protocol handler;

when a client device reconnects to the server, transmitting to the reconnecting client device a game state based on the game state maintained on the server.

8. The method of claim 7 wherein at least one of the client devices is a wireless phone.

9. The method of claim 7 wherein at least one of the client devices is a wireless device.

10. The method of claim 7 further comprising providing a game world for a plurality of users, wherein the plurality of users are on a variety of different types of client devices.

11. A computer-readable medium whose contents cause a client device to assist a user in playing a game on a server, the game containing a persistent game world, comprising:

establishing a game state for the game via a player component associated with the user;

disconnecting from the game on the server, wherein the user is at a particular state of the game, wherein the disconnection ends an early session, and wherein the early session is played on a first client device having a first device type;

reconnecting to the game at a later time;

transmitting identifying information to the server, wherein the identifying information is used by a protocol handler at the server, and wherein the protocol handler facilitates communication with multiple client devices each having a distinct device type; and playing the game in a later session, wherein the state of the game at the beginning of the later session is based on the state of the game at the end of the early session, and wherein the later session is played on a second client device having a second device type.

12. The computer-readable medium of claim 11 further comprising selecting a WML link to advance the state of the game.

13. The computer-readable medium of claim 11 wherein the state of the game at the end of the early session and the state of the game at the beginning of the later session are the same.

14. An electronic gaming system for providing a gaming environment to one or more users on client devices, comprising:

a connection component for disconnecting from or connecting to the game on the server;

a transmission component for transmitting identifying information to the server, wherein the identifying information is used by a protocol handler at the server, and wherein the protocol handler facilitates communication with multiple client devices each having a distinct platform; and a game playing component, the game playing component starting a second session at a game state based on a game state achieved during a previous gaming session, wherein the previous session was played on a first client device having a first platform, and wherein the second session is configured for playing on the first client device, on a second client device having the first platform, or on a third client device having a second platform distinct from the first platform.

15. The electronic gaming system of claim 14 further comprising a selection component for selecting a WML link to advance the state of the game.

16. The electronic gaming system of claim 14 wherein the client device is a wireless phone.

17. A electronic gaming system for providing a gaming environment for one or more players on client devices comprising:

a maintenance component for maintaining a game state on a server for any player, wherein each player can be associated with one or more client devices having distinct platforms;

a protocol handler component for reconnecting to the server, wherein the protocol handler component facilitates communication with multiple client devices, and wherein at least some of the multiple client devices communicate using distinct protocols; and a reception component for receiving a game state at a client device, wherein the game state is based on the maintained game state.

18. The electronic gaming system of claim 17 wherein at least one of the client devices is a wireless phone.

19. The electronic gaming system of claim 17 further comprising a game world for a plurality of users, wherein the plurality of users are on a variety of different client devices.

* * * * *